United States Patent
Fan et al.

(10) Patent No.: US 12,487,146 B2
(45) Date of Patent: Dec. 2, 2025

(54) UNDERGROUND PIPE LEAK DETECTION SYSTEM AND METHOD

(71) Applicant: Industrial Technology Research Institute, Hsinchu (TW)

(72) Inventors: Sheng-Cyuan Fan, Hsinchu (TW); Che-Wei Yeh, New Taipei (TW); Wun-Sheng Huang, Miaoli County (TW); Long He, New Taipei (TW); Chien-Cheng Chu, Taipei (TW); Hsin-Yu Chiu, Taipei (TW); Feng-Jie Tsai, Tainan (TW); Fu-Te Hsu, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 955 days.

(21) Appl. No.: 17/678,918

(22) Filed: Feb. 23, 2022

(65) Prior Publication Data
US 2023/0184619 A1   Jun. 15, 2023

(30) Foreign Application Priority Data
Dec. 9, 2021   (TW) .............................. 110146007

(51) Int. Cl.
*G01M 3/24*   (2006.01)
*G01M 3/00*   (2006.01)
(Continued)

(52) U.S. Cl.
CPC ............ *G01M 3/243* (2013.01); *G01M 3/007* (2013.01); *G06F 18/214* (2023.01); *G06F 17/142* (2013.01)

(58) Field of Classification Search
CPC ..... G01M 3/243; G01M 3/007; G06F 18/214; G06F 17/142; G06F 17/18; G06N 20/00
See application file for complete search history.

(56) References Cited

U.S. PATENT DOCUMENTS

| | | |
|---|---|---|
| 6,530,263 B1 | 3/2003 | Chana |
| 6,595,038 B2 | 7/2003 | Williams et al. |

(Continued)

FOREIGN PATENT DOCUMENTS

| | | |
|---|---|---|
| CN | 1808087 A | 7/2006 |
| CN | 105051513 A | 11/2015 |

(Continued)

OTHER PUBLICATIONS

Butterfield, J.D., et al. "Experimental investigation into vibro-acoustic emission signal processing techniques to quantify leak flow rate in plastic water distribution pipes" Applied Acoustics 119, 2017, pp. 146-155, Elsevier Ltd. US.

(Continued)

*Primary Examiner* — Pei Yong Weng

(57) ABSTRACT

Provided is an underground pipe leak detection system, including a sensing device, a storage device, and a processing device. The sensing device is used for collecting a voice signal from an underground pipe during a time period. The storage device is used for storing a voice dataset, and storing the voice signal transmitted by the sensing device. The processing device may access the storage device. The processing device is configured to execute the following operations: training a classification model using the voice dataset; extracting features of the voice signal; inputting the features of the voice signal into the classification model that has been trained to determine if there is a leak in the underground pipe.

17 Claims, 6 Drawing Sheets

(51) Int. Cl.
     *G06F 18/214*     (2023.01)
     *G06F 17/14*     (2006.01)

(56) References Cited

U.S. PATENT DOCUMENTS

| | | | | |
|---|---|---|---|---|
| 2008/0130909 A1* | 6/2008 | Ahn | ............ | H03G 7/004 |
| | | | | 381/71.2 |
| 2012/0007744 A1* | 1/2012 | Pal | ............ | G01M 3/243 |
| | | | | 702/51 |
| 2012/0035765 A1* | 2/2012 | Sato | ............ | G06F 3/015 |
| | | | | 600/300 |
| 2018/0293723 A1* | 10/2018 | Bae | ............ | G06F 18/2115 |
| 2021/0215568 A1 | 7/2021 | Hori et al. | | |

FOREIGN PATENT DOCUMENTS

| | | |
|---|---|---|
| CN | 108571659 A | 9/2018 |
| CN | 109931506 A | 6/2019 |
| CN | 109945075 A | 6/2019 |
| CN | 111664364 A | 9/2020 |
| CN | 211574791 U | 9/2020 |
| CN | 112949817 A | 6/2021 |
| JP | 2020-51964 A | 4/2020 |
| TW | M526069 | 7/2016 |
| TW | I630379 B | 7/2018 |
| TW | 202030461 A | 8/2020 |

OTHER PUBLICATIONS

Taiwan Patent Office, Office Action, Patent Application Serial No. 110146007, Aug. 2, 2022, Taiwan.

* cited by examiner

300A

300B

UNDERGROUND PIPE LEAK DETECTION SYSTEM AND METHOD

CROSS REFERENCE TO RELATED APPLICATIONS

This application claims priority of Taiwan Patent Application No. 110146007, filed on Dec. 9, 2021, the entirety of which is incorporated by reference herein.

BACKGROUND OF THE INVENTION

Field of the Invention

The present disclosure relates to acoustic detection techniques, particularly to an underground pipe leak detection system and method.

Description of the Related Art

Currently, over 80% of water pipes have been in use for over 30 years. These old, brittle pipes may break and thus result in leakage due to high water pressure. According to official statistics, 700 million tons of water per year is lost in Taiwan due to leakage. This amount of water could supply domestic and industrial usage in Taiwan for over 2 months. The total length of the water pipes in Taiwan is over 59,000 kilometers. However, there are only 67 people who are in charge of detecting leaks. On average, that is one person for every 879 kilometers of pipe. These people are still using old-fashioned methods, such as using a "dowsing rod", and detecting leaks manually based on their own experience. The effectiveness of their detection abilities may be limited to the practical experience of each individual inspector, as well as to their moving range. In addition, leaks may not be found right away.

The methods of manual detection described above lack stability, coverage, and efficiency. To solve these problems, there is a need for an underground pipe leak detection system and method that may expand the coverage of detection by deploying widespread sensors, and analyze the data collected from different places simultaneously, thereby determining the exact location and condition of each leak in real time.

BRIEF SUMMARY OF THE INVENTION

An embodiment of the present disclosure provides an underground pipe leak detection system, including a sensing device, a storage device, and a processing device. The sensing device is used for collecting a voice signal from an underground pipe during a time period. The storage device is used for storing a voice dataset, and storing the voice signal transmitted by the sensing device. The processing device has access to the storage device. The processing device is configured to execute the following operations: training a classification model using the voice dataset, wherein the voice dataset includes a plurality of voice-data-with-leak and a plurality of voice-data-without-leak, and each of the voice data includes features of a historical voice signal; extracting features of the voice signal; and inputting the features of the voice signal into the classification model that has been trained to determine if there is a leak in the underground pipe.

In some embodiments, the features include time domain features and frequency domain features. The processing device is further configured to perform a Fast Fourier Transform on the voice signal to extract the time domain features and the frequency domain features of the voice signal.

In some embodiments, each of the voice-data-with-leak in the voice dataset that is used for training the classification model includes a cleft shape parameter. The processing device is further configured to input the features of the voice signal into the classification model that has been trained, so as to determine a cleft shape of the leak of the underground pipe.

In some embodiments, the processing device is further configured to train a regression model using the voice dataset, wherein each of the voice-data-with-leak in the voice dataset includes a cleft size parameter that corresponds to the cleft shape parameter. The processing device is further configured to input the features of the voice signal into the regression model that has been trained, so as to calculate the cleft size of the leak of the underground pipe.

In some embodiments, each of the voice-data-with-leak in the voice dataset that is used for training the classification model includes a pipe material structure parameter. The processing device is further configured to input the features of the voice signal into the classification model, so as to determine the material and the structure of the underground pipe.

In some embodiments, the processing device is further configured to train a regression model using the voice dataset, wherein each of the voice-data-with-leak in the voice dataset includes a leak distance parameter. The processing device is further configured to input the features of the voice signal into the regression model that has been trained, so as to calculate the distance between the leak of the underground pipe and the sensing device.

In some embodiments, the processing device is further configured to calculate the location of the leak based on the distances between the leak of the underground pipe and the sensing devices at different locations during the time period, as well as the coordinates transmitted from the sensing devices.

In some embodiments, each of the voice data in the voice dataset includes an ambient interference parameter. The processing device is further configured to execute an ambient interference removal operation, so as to remove elements of ambient interference from the voice signal.

In some embodiments, the processing device is further configured to execute an abnormal event removal operation, so as to remove elements of abnormal events from the voice signal.

In some embodiments, the sensing device further includes a hydrophone, a charge amplifier, a filter, an A/D converter, and a processor. The hydrophone is used for collecting an original signal from the underground pipe during the time period. The charge amplifier is used for amplifying the output power of the original signal. The filter is used for filtering the original signal whose output power has been amplified, so as to remove noises whose frequency is not in a specific range from the original signal. The A/D converter is used for converting the original signal that has been filtered from an analog signal to a digital signal. The original signal that that has been converted is the voice signal. The processor is used for transmitting the voice signal to the storage device.

An embodiment of the present disclosure further provides an underground pipe leak detection method that includes the following operations. A processing device trains a classification model using the voice dataset, wherein the voice dataset comprises a plurality of voice-data-with-leak and a plurality of voice-data-without-leak, and each of the voice data includes features of a historical voice signal. A sensing device is used to collect a voice signal from an underground pipe during a time period. The processing device extracts features of the voice signal and inputs the features of the voice signal into the classification model that has been trained to determine if there is a leak in the underground pipe.

In some embodiments, the features include time domain features and frequency domain features, and the method further includes using the processing device to perform a Fast Fourier Transform on the voice signal to extract the time domain features and the frequency domain features of the voice signal.

In some embodiments, the method further includes using the processing device to input the features of the voice signal into the classification model that has been trained, so as to determine the cleft shape of the leak of the underground pipe. Each of the voice-data-with-leak in the voice dataset that is used for training the classification model includes a cleft shape parameter.

In some embodiments, the method further includes using the processing device to: train a regression model using the voice dataset, wherein each of the voice-data-with-leak in the voice dataset includes a cleft size parameter that corresponds to the cleft shape parameter; and input the features of the voice signal into the regression model that has been trained, so as to calculate the cleft size of the leak of the underground pipe.

In some embodiments, the method further includes using the processing device to input the features of the voice signal into the classification model, so as to determine the material and structure of the underground pipe. Each of the voice-data-with-leak in the voice dataset that is used for training the classification model includes a pipe material structure parameter.

In some embodiments, the method further includes using the processing device to: train a regression model using the voice dataset, wherein each of the voice-data-with-leak in the voice dataset includes a leak distance parameter: and input the features of the voice signal into the regression model that has been trained, so as to calculate the distance between the leak of the underground pipe and the sensing device.

In some embodiments, the method further includes using the processing device to calculate the location of the leak based on the distances between the leak of the underground pipe and the sensing devices at different locations during the time period, as well as the coordinates transmitted from the sensing devices.

In some embodiments, the method further includes using the processing device to execute an ambient interference removal operation, so as to remove elements of ambient interference from the voice signal. Each of the voice data in the voice dataset includes an ambient interference parameter.

In some embodiments, the method further includes using the processing device to execute an abnormal event removal operation, so as to remove elements of abnormal events from the voice signal.

The underground pipe leak detection system provided by the present disclosure combines techniques of Internet of Things (IoT), signal processing, and machine learning, trains a machine learning model using the voice dataset collected and accumulated from the past, extracts features from the voice signal, inputs the extracted features into a classification model that has been trained, so as to determine if there is a leak, and further calculates the possible locations of the leak. Compared to conventional manual detection, the system of the present disclosure economizes manpower, provides immediacy of detection, and increases the efficiency of detection.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

In each of the following embodiments, the same reference numbers represent identical or similar elements or components.

Figure 1:
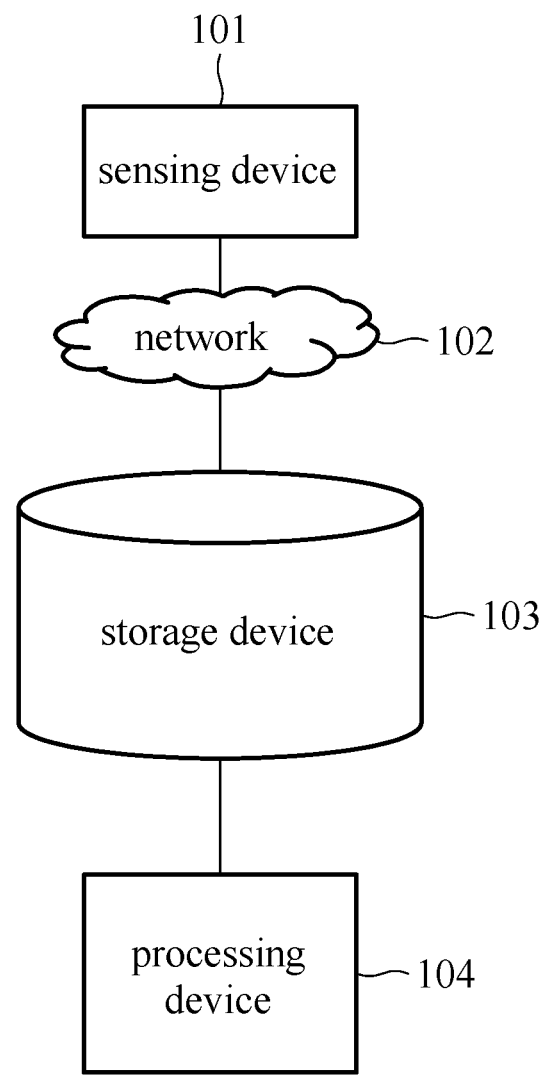
FIG. 1 illustrates the structural diagram of an underground pipe leak detection system, according to an embodiment of the present disclosure.

FIG. 1 illustrates the structural diagram of an underground pipe leak detection system 100, according to an embodiment of the present disclosure. As shown in FIG. 1, the system 100 may include a sensing device 101, a storage device 103, and a processing device 104. The sensing device 101 may communicate with the storage device 103 via network 102. The storage device 103 and the processing device 104 may be accommodated in the same electronic device, or may be installed on different electronic devices. The processing device 104 may be connected to the storage device 103 by wired or wireless ways, so as to access the data stored in the storage device 103.

The sensing device 101 is a physical device that can detect ambient voice signals, and transmit the information detected to other devices. Typically, the sensing device 101 may include a sensing element for receiving power, and a converting element for converting power. In the embodiments of the present disclosure, the sensing device 101 may be installed at a location where the underground pipe goes through, so as to detect the voice signals from the underground pipe. In an embodiment, the sensing device 101 may be installed on or embedded in an underground hydrant that is portable and fast to be installed.

The network 102 may support various known protocols, such as TCP/IP, OSI, FTP, FTPS, UPnP, NFS, CIFS, and AppleTalk. The network 102 may be, for example, local area network (LAN), wide area network (WAN), virtual private network (VPN), Internet, Intranet, Extranet, public switched telephone network, infrared network, wireless network, or any combination thereof. In an embodiment, the network 102 adopts high-speed wireless communication based on long term evolution (LTE), which transmits FTP/FTPS data in form of AT commands through a universal asynchronous receiver/transmitter (UART). In the embodiments of the present disclosure, the sensing device 101 transmits voice signals collected to the storage device 103 via the network 102.

The storage device 103 may be any device for storing data, such as a disk driver, an optical storage element, and solid storage devices such as RAM, ROM, removable media device, memory card, or flash memory card, the present disclosure is not limited thereto. In the embodiments of the present disclosure, the storage device 103 is used for storing the voice signals transmitted by the sensing device 101, and for storing the voice dataset for training the classification model.

The processing device 104 may be any device for executing instructions, such as a CPU, a microprocessor, a controller, a microcontroller, or a state machine, the present disclosure is not limited thereto. In the embodiments of the present disclosure, the processing device 104 may access the voice signals and the voice dataset stored by the storage device 103.

Figure 2:
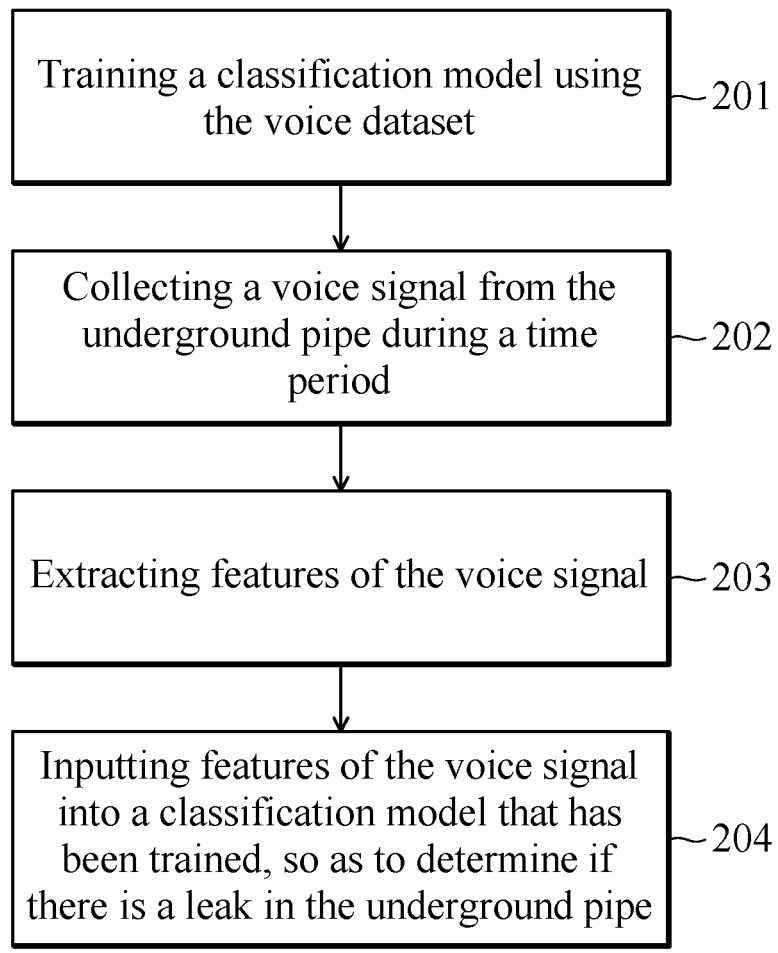
FIG. 2 illustrates the flow diagram of an underground pipe leak detection method.

FIG. 2 illustrates the flow diagram of an underground pipe leak detection method 200, according to an embodiment of the present disclosure. As shown in FIG. 2, method 200 includes operations 201-204.

Method 200 starts in operation 201. In operation 201, a classification model is trained by the processing device (e.g., the processing device 104 in FIG. 1) using the voice dataset.

In operation 202, a voice signal from the underground pipe during a time period (e.g., 10 seconds, 30 second, or 1 minute, the present disclosure is not limited thereto) is collected by a sensing device (e.g., the sensing device 101 in FIG. 1).

In operation 203, features of the voice signal collected in operation 202 are extracted by the processing device (e.g., the processing device 104 in FIG. 1).

In operation 204, features of the voice signal are input into a classification model that has been trained, so as to determine if there is a leak in the underground pipe.

In some embodiments, the voice dataset for training the classification model includes a plurality of voice-data-with-leak and a plurality of voice-data-without-leak. Each voice data includes features of a historical voice signal. The historical voice signals may be the voice signals collected from the underground pipe by the sensing device (e.g., the sensing device 101 in FIG. 1) in the past, including voice signals with leak (i.e., the voice signals when there is a leak in the underground pipe making leak voice) and voice signals without leak (i.e., the voice signal when there is no leak in the underground pipe making leak voice). In some embodiments, the voice-data-with-leak and the voice-data-without-leak may include the features that were respectively extracted by the processing device (e.g., the processing device 104 in FIG. 1) from the voice signals with leak and the voice signals without leak. Therefore, the voice-data-with-leak may have the features of the leak voice made by the leak in the underground pipe, while the voice-data-without-leak may not have the features of the leak voice made by the leak in the underground pipe.

In some embodiments, the classification model described above may be any classifiers known in the field of machine learning, such as decision tree, logistic regression, naïve Bayes, random forest, support vector machine (SVM), or neural network (NN), the present disclosure is not limited thereto. The classification model is trained by repeatedly feeding back results and updating parameters to gradually decrease the error rate of the result output by the model, according to the features of the data provided by the training dataset (e.g., the voice dataset described above). As such, the classification model that has been trained may be able to determine which predefined category (e.g., including or not including the leak voice made by the leak in the underground pipe) a new data (e.g., the voice signal collected in operation 202) belongs to.

In some embodiments, the features described above may include time domain features and frequency domain features. The time domain features may further include peak values, kurtosis, allowance, skewness, mean, root mean square (RMS), impulse factors, form factors, and/or crest factors, the present disclosure is not limited thereto. The frequency domain features may indicate the correspondence between frequency and power.

In some embodiments, the time domain features and frequency domain features described above may be extracted by using the processing device (e.g., the processing device 104 in FIG. 1) to perform a Fast Fourier Transform (FFT) on the voice signals (e.g., the historical voice signals for training the classification model, or the voice signal collected in operation 202).

Figure 3A:
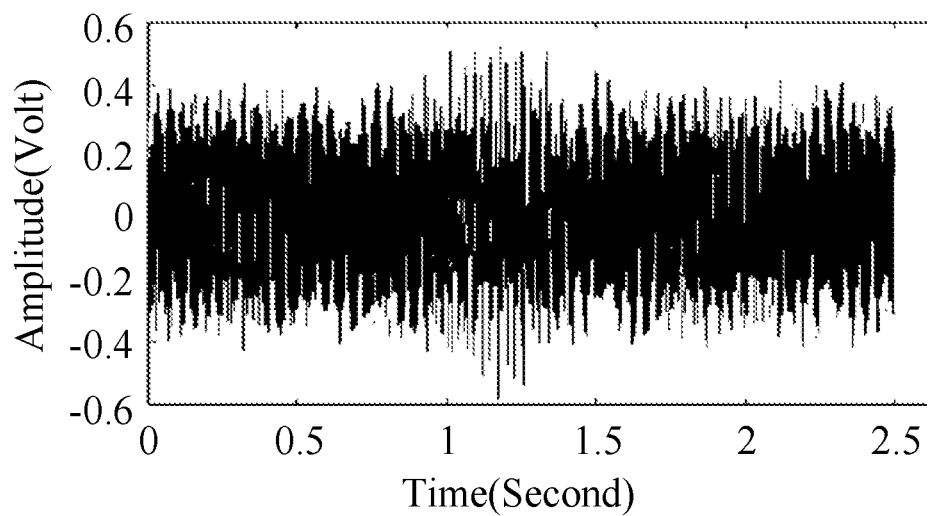
FIG. 3A provides a time domain diagram of an exemplary voice signal without leak, according to an embodiment of the present disclosure.
Figure 3B:
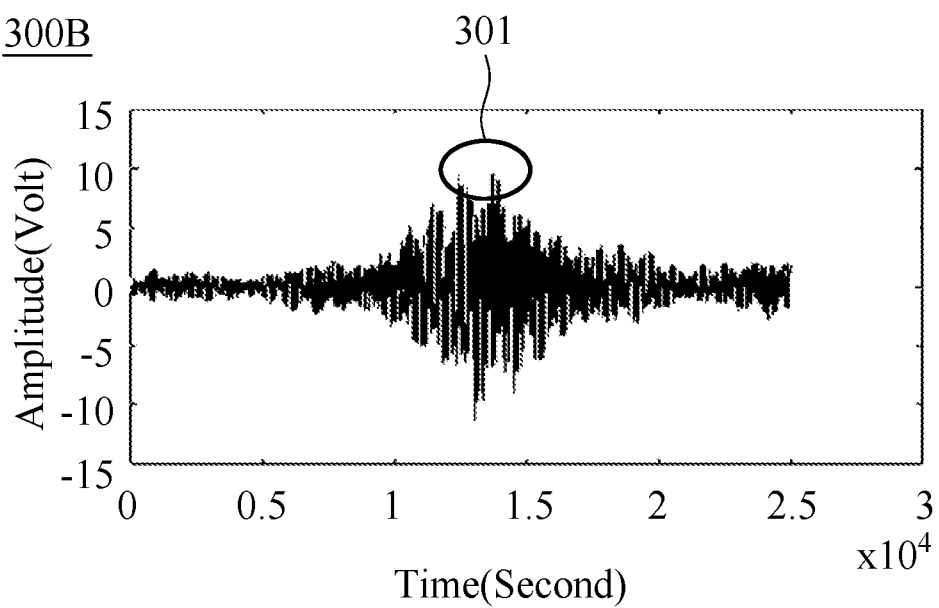
FIG. 3B provides a time domain diagram of an exemplary voice signal with leak, according to an embodiment of the present disclosure.

The time domain feature described above may be displayed by a time domain diagram. FIG. 3A and FIG. 3B respectively provide a time domain diagram 300A of an exemplary voice signal without leak, and a time domain diagram 300B of an exemplary voice signal with leak, according to an embodiment of the present disclosure. In the time domain diagram 300A, the amplitude of the voice signal without leak constantly oscillates between 0.5 Volt and −0.5 Volt as time proceeds, displaying relatively stable time domain features. In contrast, in the time domain diagram 300B, the amplitude of the voice signal with leak has an outstanding peak 301 around 1.2 second to 1.5 second, displaying dramatically changing time domain features.

Figure 4:
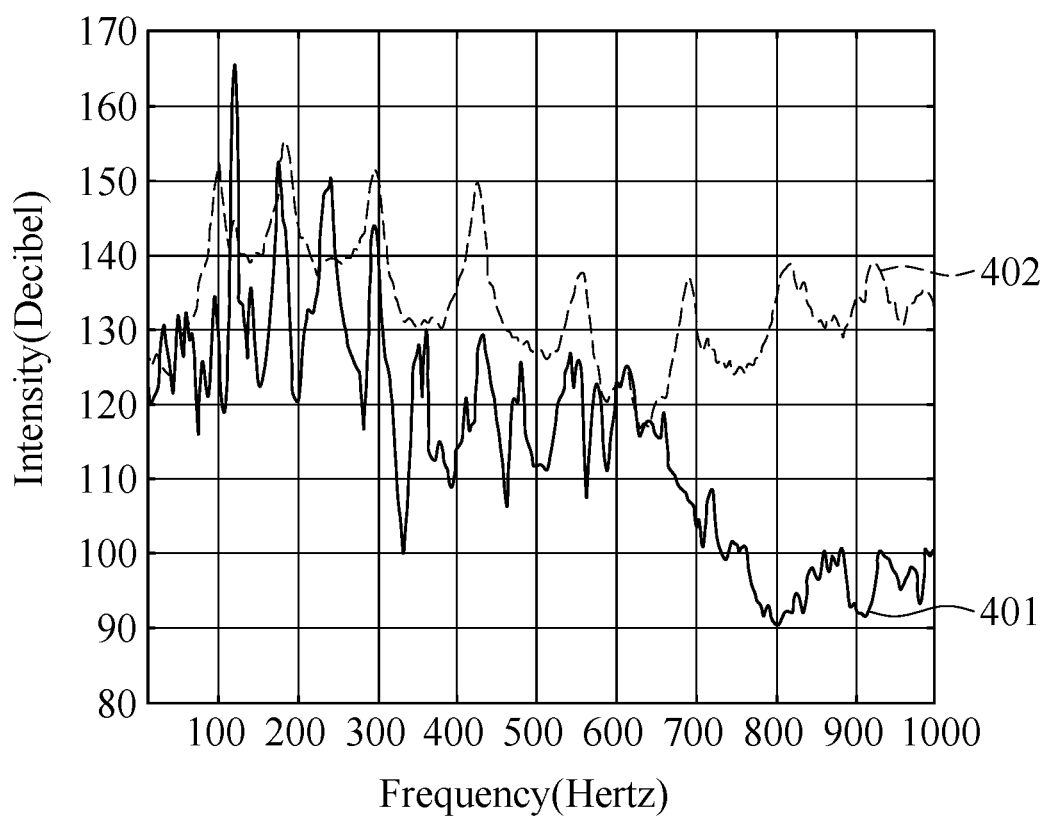
FIG. 4 provides an exemplary spectrogram, according to an embodiment of the present disclosure.

The frequency domain features described above may be displayed by a spectrogram. FIG. 4 provides an exemplary spectrogram 400, according to an embodiment of the present disclosure. As shown in FIG. 4, in the spectrogram 400, the difference in intensity between the frequency spectrum 401 of the voice signal without leak and the frequency spectrum 402 of the voice signal with leak is relatively obvious at a high frequency band (e.g., 700-100 Hertz).

Due to the difference between the time domain features of the voice signal without leak and the voice signal with leak (as shown by FIG. 3A and FIG. 3B), and the difference between the frequency domain feature of the voice signal without leak and the voice signal with leak (as shown by FIG. 4), the classification model that has been trained is able to determine if the voice signal belongs to the voice signal with leak or the voice signal without leak, according to the time domain features and the frequency domain features of the voice signal.

In some embodiments, each of the voice-data-with-leak in the voice dataset for training the classification model includes a cleft shape parameter. The cleft shape parameter indicates the cleft shape of the leak in the underground pipe which the voice signal with leak corresponding to the voice-data-with-leak was collected from, such as square or circle.

The leak voices made by the leak with different cleft shapes may also result in the corresponding voice signals having different time domain features and frequency domain features. As such, the classification model that has been trained is able to determine the cleft shape of the leak in the underground pipe. Therefore, the underground pipe detection method provided by the present disclosure may further include using a processing device (e.g., the processing device 104 in FIG. 1) to input the collected features of the voice signal into the classification model that has been trained, so as to determine the cleft shape of the leak in the underground pipe.

In some embodiments, each of the voice-data-with-leak in the voice dataset for training the classification model may further include a cleft size parameter that corresponds to the cleft shape parameter. The cleft size parameter indicates the size of the cleft of the leak in the underground pipe on the underground pipe which the voice signal with leak corresponding to the voice-data-with-leak was collected from. For example, if the cleft shape parameter is square, the corresponding cleft size may indicate the length of the square cleft of the leak. If the cleft shape parameter is circle, the corresponding cleft size may indicate the radius or the diameter of the circle cleft of the leak.

The leak voices made by the leak with different cleft size may also result in the corresponding voice signals having different time domain features and frequency domain features, so a regression model can be used for calculating the cleft size of the leak. Therefore, the underground pipe detection method provided by the present disclosure may further include using a processing device (e.g., the processing device 104 in FIG. 1) to train a regression model using the voice dataset, and to input the collected features of the voice signal into the regression model that has been trained, so as to calculate the cleft size of the leak in the underground pipe.

The regression model described above may be any regression model known in the field of machine learning, such as linear regression, polynomial regression, logistic regression, or nonlinear regression, the present disclosure is not limited thereto.

In some embodiments, each of the voice-data-with-leak in the voice dataset for training the classification model may include a pipe material structure parameter. The pipe material structure parameter indicates the pipe material (e.g., stainless steel pipe, PE pipe, or PPR pipe) and structure (e.g., long-straight pipe, bent pipe, or reducer pipe) of the underground pipe which the voice signal with leak corresponding to the voice-data-with-leak was collected from.

Pipes having different pipe materials and structures may also result in the corresponding voice signals having different time domain features and frequency domain features. As such, the classification model that has been trained is able to determine the pipe material and structure of the underground pipe. Therefore, the underground pipe detection method provided by the present disclosure may further include using a processing device (e.g., the processing device 104 in FIG. 1) to input the collected features of the voice signal into the classification model that has been trained, so as to determine the pipe material and structure of the underground pipe.

In some embodiments, each of the voice-data-with-leak in the voice dataset for training the classification model may further include a leak distance parameter. The leak distance parameter indicates the distance between the sensing device and the leak in the underground pipe which the voice signal with leak corresponding to the voice-data-with-leak was collected from.

The distance between the sensing device and the leak in the underground pipe may also result in the corresponding voice signals having different time domain features and frequency domain features, so a regression model can be used for calculating the distance between the leak and the sensing device. Therefore, the underground pipe detection method provided by the present disclosure may further include using a processing device (e.g., the processing device 104 in FIG. 1) to train a regression model using the voice dataset, and to input the collected features of the voice signal into the regression model that has been trained, so as to calculate the distance between the sensing device and the leak in the underground pipe.

It should be appreciated that the distance between the leak and the sensing device calculated using the regression model is an estimated value. There is a difference between the estimated value and the distance between the leak and the sensing device in the real world. However, by using the estimated values of the distances between the leak and multiple sensing devices, we may still calculate the possible locations where the leak may locate.

In an embodiment, the underground pipe leak detection method may further include using a processing device (e.g., the processing device 104 in FIG. 1) to calculate the location of the leak based on the distances between the leak of the underground pipe and the sensing devices at different locations during a time period (e.g., 10 seconds, 30 second, or 1 minute, the present disclosure is not limited thereto), as well as the coordinates transmitted from the sensing devices (e.g., the sensing device 101 in FIG. 1).

Figure 5:
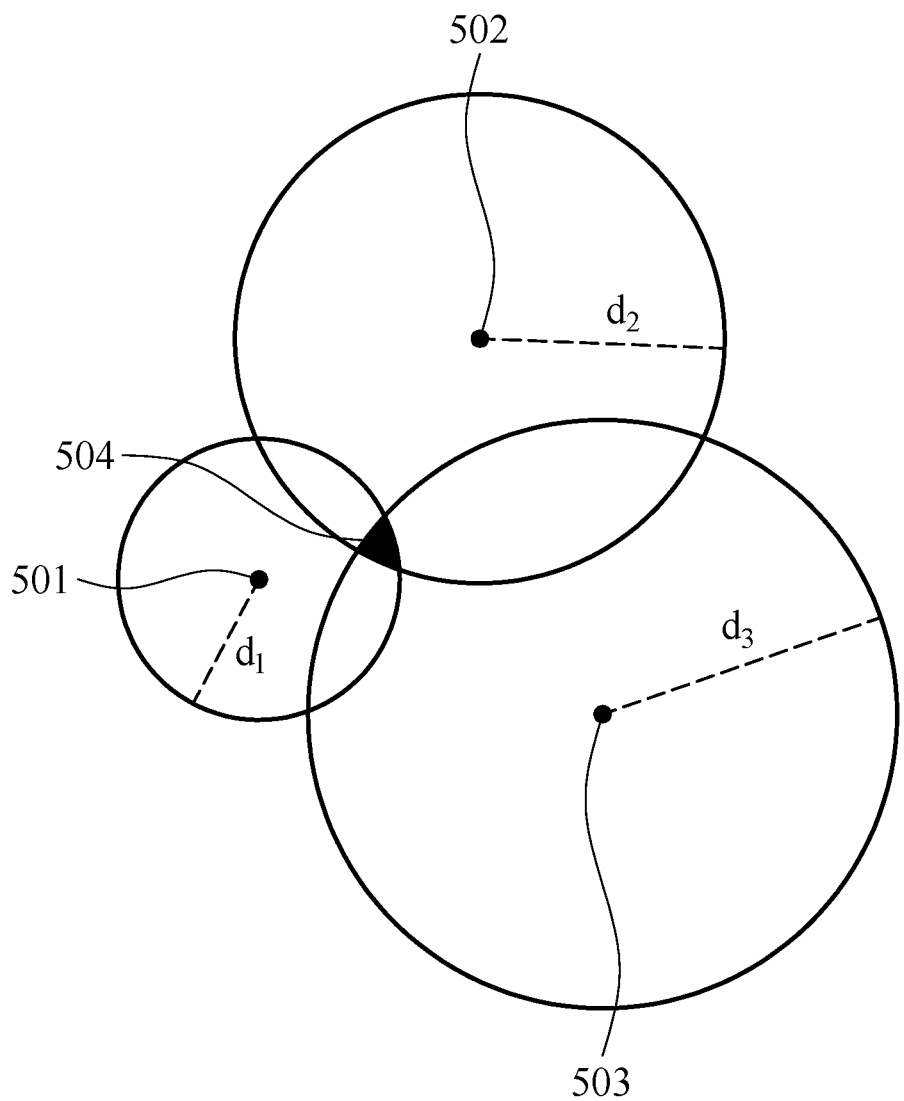
FIG. 5 illustrates the conceptual diagram for calculating the location of the leak based on the distances between the leak and multiple sensing devices, as well as the coordinates of the sensing devices, according to an embodiment of the present disclosure.

FIG. 5 illustrates the conceptual diagram for calculating the location of the leak based on the distances between the leak and multiple sensing devices, as well as the coordinates of the sensing devices, according to an embodiment of the present disclosure. In the example shown by FIG. 5, the distances between the leak and the location 501, the location 502, the location 503, where the sensing devices are located, are $d_1$, $d_2$, and $d_3$ respectively, which has been calculated using the regression model as previously described. Three circles are respectively drawn by using the location 501, the location 502, and the location 503 as the center of the circle, and using $d_1$, $d_2$, and $d_3$ as radius. The distances from the location 501, the location 502, and the location 503 to the points in the area 504, where the three circles overlap, are relatively near $d_1$, $d_2$, and $d_3$ respectively. Therefore, it is rather possible that the location of the leak is in the area 504, or at least near the area 504. As such, the possible locations of the leak is limited, and the time required for locating the leak is reduced.

In some embodiments, each of the voice-data-with-leak in the voice dataset may include an ambient interference parameter. The ambient interference parameter indicates the background noises that constantly occur during a time period near the underground pipe which the voice signal with leak corresponding to the voice-data-with-leak was collected from, such as bark voices, vehicle engine voices, or construction voices. The underground pipe leak detection method provided by the present disclosure may further include using the processing device (e.g., the processing device 104 in FIG. 1) to execute an ambient interference removal operation, so as to remove the elements of ambient interference from the voice signal.

In some embodiments, the underground pipe leak detection method provided by the present disclosure may further include using the processing device (e.g., the processing device 104 in FIG. 1) to execute an abnormal event removal operation, so as to remove the elements of abnormal events, such as the impact voices made by objects abruptly falling on the ground, from the voice signal.

Figure 6:
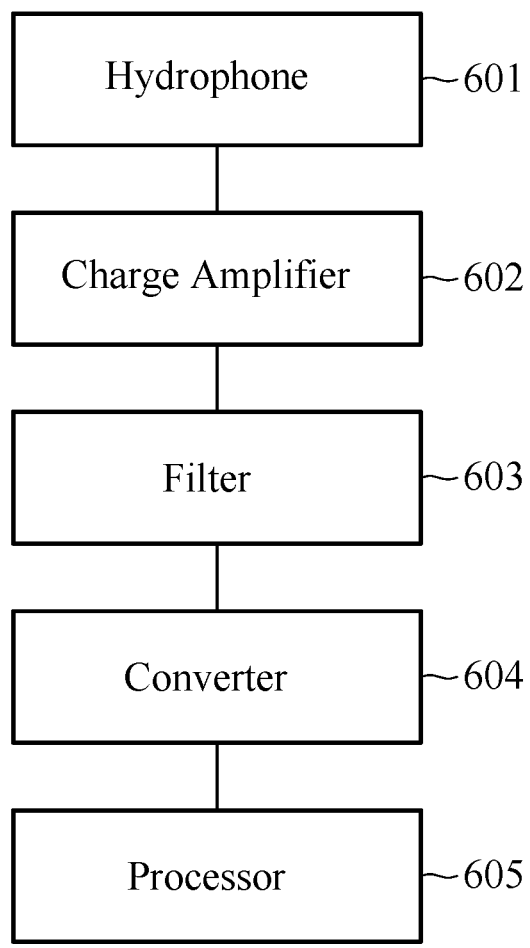
FIG. 6 illustrates the structural diagram of an example of the sensing device, according to an embodiment of the present disclosure.

FIG. 6 further illustrates the structural diagram of an example of the sensing device 101 in FIG. 1. As shown in FIG. 6, the sensing device 101 in this example may include elements such as a hydrophone 601, a charge amplifier 602, a filter 603, an A/D converter 604, and a processor 605. These elements may be coupled to each other through the bus, so as to communicate with each other.

In an embodiment, the hydrophone 601 is used for collecting an original signal from the underground pipe during the time period, and transmitting the original signal to the charge amplifier 602. The charge amplifier 602 is used for amplifying the output power of the original signal (e.g., from 0.25 millivolt to 0.5 millivolt), and transmitting the original signal whose power has been amplified to the filter 603. The filter 603 is used for filtering the original signal whose output power has been amplified, so as to remove noises whose frequency is not in a specific range (e.g., 200-2000 Hertz) from the original signal, and transmitting the original signal that has been filtered to the A/D converter 604. The A/D converter 604 is used for converting the original signal that has been filtered from an analog signal to a digital signal, and transmitting the original signal that that has been converted, which is the voice signal described above, to the processor 605. The processor 605 may be a microprocessor or a microcontroller, used for transmitting the voice signal to the storage device (e.g., the storage device 103 in FIG. 1).

The underground pipe leak detection system provided by the present disclosure combines techniques of Internet of Things (IoT), signal processing, and machine learning, trains a machine learning model using the voice dataset collected and accumulated from the past, extracts features from the voice signal, inputs the extracted features into a classification model that has been trained, so as to determine if there is a leak, and further calculates the possible locations of the leak. Compared to conventional manual detection, the system of the present disclosure economizes manpower, provides immediacy of detection, and increases the efficiency of detection.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An underground pipe leak detection system, comprising:
   a sensing device, used for collecting a voice signal from an underground pipe during a time period;
   a storage device used for storing a voice dataset, and storing the voice signal transmitted by the sensing device; and
   a processing device, accessible to the storage device, and configured to execute the following operations:
   training a classification model using the voice dataset, wherein the voice dataset comprises a plurality of voice-data-with-leak and a plurality of voice-data-without-leak, and each of the voice data includes features of a historical voice signal;
   extracting features of the voice signal; and
   inputting the features of the voice signal into the classification model that has been trained to determine if there is a leak in the underground pipe;
   wherein each of the voice-data-with-leak in the voice dataset that is used for training the classification model includes a cleft shape parameter; and
   wherein the processing device is further configured to input the features of the voice signal into the classification model that has been trained, so as to determine a cleft shape of the leak of the underground pipe.

2. The system as claimed in claim 1, wherein the features comprise time domain features and frequency domain features; and
   wherein the processing device is further configured to perform a Fast Fourier Transform on the voice signal to extract the time domain features and the frequency domain features of the voice signal.

3. The system as claimed in claim 1, wherein the processing device is further configured to train a regression model using the voice dataset, wherein each of the voice-data-with-leak in the voice dataset includes a cleft size parameter that corresponds to the cleft shape parameter; and
   wherein the processing device is further configured to input the features of the voice signal into the regression model that has been trained, so as to calculate the cleft size of the leak of the underground pipe.

4. The system as claimed in claim 1, wherein each of the voice-data-with-leak in the voice dataset that is used for training the classification model includes a pipe material structure parameter; and
   wherein the processing device is further configured to input the features of the voice signal into the classification model, so as to determine material and structure of the underground pipe.

5. The system as claimed in claim 4, wherein the processing device is further configured to train a regression model using the voice dataset, wherein each of the voice-data-with-leak in the voice dataset includes a leak distance parameter; and
   wherein the processing device is further configured to input the features of the voice signal into the regression model that has been trained, so as to calculate a distance between the leak of the underground pipe and the sensing device.

6. The system as claimed in claim 1, wherein the processing device is further configured to calculate a location of the leak based on the distances between the leak of the underground pipe and the sensing devices at different locations during the time period, as well as the coordinates transmitted from the sensing devices.

7. The system as claimed in claim 1, wherein each of the voice data in the voice dataset includes an ambient interference parameter; and wherein the processing device is further configured to execute an ambient interference removal operation, so as to remove elements of ambient interference from the voice signal.

8. The system as claimed in claim 1, wherein the processor device is further configured to execute an abnormal event removal operation, so as to remove elements of abnormal events from the voice signal.

9. The system as claimed in claim 1, wherein the sensing device further comprises:
    a hydrophone, used for collecting an original signal from the underground pipe during the time period;
    a charge amplifier, used for amplifying output power of the original signal;
    a filter, used for filtering the original signal whose output power has been amplified, so as to remove noises whose frequency is not in a specific range from the original signal;
    an A/D converter, used for converting the original signal that has been filtered from an analog signal to a digital signal, wherein the original signal that that has been converted is the voice signal; and
    a processor, used for transmitting the voice signal to the storage device.

10. An underground pipe leak detection method, comprising:
    using a processing device to train a classification model using the voice dataset, wherein the voice dataset comprises a plurality of voice-data-with-leak and a plurality of voice-data-without-leak, and each of the voice data includes features of a historical voice signal;
    using a sensing device to collect a voice signal from an underground pipe during a time period;
    using the processing device to extract features of the voice signal;
    using the processing device to input the features of the voice signal into the classification model that has been trained to determine if there is a leak in the underground pipe; and
    using the processing device to input the features of the voice signal into the classification model that has been trained, so as to determine a cleft shape of the leak of the underground pipe;
    wherein each of the voice-data-with-leak in the voice dataset that is used for training the classification model includes a cleft shape parameter.

11. The method as claimed in claim 10, wherein the features comprise time domain features and frequency domain features; and
    wherein the method further comprises:
    using the processing device to perform a Fast Fourier Transform on the voice signal to extract the time domain features and the frequency domain features of the voice signal.

12. The method as claimed in claim 10, further comprising:
    using the processing device to train a regression model using the voice dataset, wherein each of the voice-data-with-leak in the voice dataset includes a cleft size parameter that corresponds to the cleft shape parameter; and
    using the processing device to input the features of the voice signal into the regression model that has been trained, so as to calculate the cleft size of the leak of the underground pipe.

13. The method as claimed in claim 10, further comprising:
    using the processing device to input the features of the voice signal into the classification model, so as to determine the material and structure of the underground pipe;
    wherein each of the voice-data-with-leak in the voice dataset that is used for training the classification model includes a pipe material structure parameter.

14. The method as claimed in claim 13, further comprising:
    using the processing device to train a regression model using the voice dataset, wherein each of the voice-data-with-leak in the voice dataset includes a leak distance parameter; and
    using the processing device to input the features of the voice signal into the regression model that has been trained, so as to calculate the distance between the leak of the underground pipe and the sensing device.

15. The method as claimed in claim 14, further comprising:
    using the processing device to calculate the location of the leak based on the distances between the leak of the underground pipe and the sensing devices at different locations during the time period, as well as the coordinates transmitted from the sensing devices.

16. The method as claimed in claim 10, further comprising:
    using the processing device to execute an ambient interference removal operation, so as to remove elements of ambient interference from the voice signal;
    wherein each of the voice data in the voice dataset includes an ambient interference parameter.

17. The method as claimed in claim 10, further comprising:
    using the processing device to execute an abnormal event removal operation, so as to remove elements of abnormal events from the voice signal.

* * * * *